(12) United States Patent
Luo

(10) Patent No.: US 8,651,376 B2
(45) Date of Patent: Feb. 18, 2014

(54) NEAR FIELD COMMUNICATION DEVICE, AUTHENTICATION SYSTEM USING THE SAME AND AUTHENTICATION METHOD THEREOF

(76) Inventor: Minsky Luo, Watchung, NJ (US)

( * ) Notice: Subject to any disclaimer, the term of this patent is extended or adjusted under 35 U.S.C. 154(b) by 53 days.

(21) Appl. No.: 13/231,983

(22) Filed: Sep. 14, 2011

(65) Prior Publication Data

US 2012/0061465 A1  Mar. 15, 2012

(30) Foreign Application Priority Data

Sep. 14, 2010 (TW) ................................ 99131053 A

(51) Int. Cl.
| | | |
|---|---|---|
| G08B 13/14 | (2006.01) | |
| G05B 19/00 | (2006.01) | |
| G05B 23/00 | (2006.01) | |
| G06F 7/00 | (2006.01) | |
| G06F 7/04 | (2006.01) | |
| H04B 1/00 | (2006.01) | |
| G06Q 40/00 | (2012.01) | |
| G06K 19/06 | (2006.01) | |
| G06K 19/00 | (2006.01) | |
| G06K 5/00 | (2006.01) | |
| G06F 7/08 | (2006.01) | |
| G07D 11/00 | (2006.01) | |
| G08C 19/00 | (2006.01) | |

(52) U.S. Cl.
USPC ............ 235/380; 235/379; 235/381; 235/487; 235/492; 235/493; 340/572.1; 340/5.6; 340/5.8

(58) Field of Classification Search
USPC ......... 235/379–381, 487, 492, 493, 435, 451; 340/572.1, 5.6, 5.8, 825.34, 5.41, 928
See application file for complete search history.

(56) References Cited

U.S. PATENT DOCUMENTS

| | | | |
|---|---|---|---|
| 5,991,749 A | 11/1999 | Morrill, Jr. | |
| 6,127,938 A * | 10/2000 | Friedman | 340/693.6 |
| 6,393,567 B1 * | 5/2002 | Colnot | 713/182 |
| 6,991,172 B2 | 1/2006 | Luu | |
| 7,239,226 B2 | 7/2007 | Berardi et al. | |
| 7,482,925 B2 * | 1/2009 | Hammad et al. | 340/572.1 |
| 7,918,335 B1 * | 4/2011 | Kitchen | 206/38 |
| 7,948,381 B2 * | 5/2011 | Lindsay et al. | 340/572.3 |
| 8,253,640 B2 * | 8/2012 | Kitayoshi et al. | 343/767 |
| 2002/0002534 A1 * | 1/2002 | Davis et al. | 705/39 |
| 2002/0030598 A1 * | 3/2002 | Dombrowski et al. | 340/572.1 |
| 2002/0133467 A1 * | 9/2002 | Hobson et al. | 705/64 |
| 2003/0014357 A1 * | 1/2003 | Chrisekos et al. | 705/39 |
| 2003/0105853 A1 * | 6/2003 | Morito et al. | 709/223 |
| 2004/0038690 A1 * | 2/2004 | Lee et al. | 455/466 |
| 2004/0230489 A1 * | 11/2004 | Goldthwaite et al. | 705/26 |

(Continued)

FOREIGN PATENT DOCUMENTS

TW         200627317         8/2006

*Primary Examiner* — Daniel Walsh

(74) *Attorney, Agent, or Firm* — Jianq Chyun IP Office

(57) ABSTRACT

A near field communication (NFC) device, an authentication system using the NFC device and an authentication method thereof are provided. The NFC device includes a RFID tag, a loop antenna, a flexible fabric packaging material and an EMI shielding material. The device can be easily adhered to objects including most handsets for mobile phone services. By adopting the authentication system and the authentication method, the device can be paired with a typical mobile phone and used to authenticate the user, thereby enabling mobile payment and mobile banking activities using mobile phones.

3 Claims, 8 Drawing Sheets

(56) References Cited

U.S. PATENT DOCUMENTS

| | | | |
|---|---|---|---|
| 2005/0024210 A1* | 2/2005 | Maki | 340/566 |
| 2005/0033619 A1* | 2/2005 | Barnes et al. | 705/7 |
| 2006/0049258 A1* | 3/2006 | Piikivi | 235/451 |
| 2006/0187060 A1* | 8/2006 | Colby | 340/572.8 |
| 2006/0220816 A1* | 10/2006 | Scheungraber et al. | 340/447 |
| 2006/0232419 A1* | 10/2006 | Tomioka et al. | 340/572.7 |
| 2006/0290501 A1* | 12/2006 | Hammad et al. | 340/572.1 |
| 2007/0040679 A1* | 2/2007 | Klosinski | 340/572.1 |
| 2007/0109130 A1* | 5/2007 | Edenfield | 340/572.8 |
| 2007/0245913 A1* | 10/2007 | Sugiyama | 101/288 |
| 2008/0204278 A1* | 8/2008 | Tsuzuki et al. | 340/928 |
| 2008/0303632 A1* | 12/2008 | Hammad | 340/10.1 |
| 2009/0005117 A1* | 1/2009 | Bashan et al. | 455/558 |
| 2009/0143104 A1* | 6/2009 | Loh et al. | 455/558 |
| 2009/0146814 A1* | 6/2009 | Hammad et al. | 340/572.1 |
| 2009/0167497 A1* | 7/2009 | Kim et al. | 340/10.1 |
| 2010/0014270 A1* | 1/2010 | Liu | 361/818 |
| 2010/0100486 A1* | 4/2010 | Mikan et al. | 705/76 |
| 2010/0117806 A1* | 5/2010 | Hong | 340/10.4 |
| 2010/0188306 A1* | 7/2010 | Kitayoshi et al. | 343/767 |
| 2010/0263179 A1* | 10/2010 | Boldin | 28/100 |
| 2012/0132718 A1* | 5/2012 | Manzi | 235/492 |
| 2012/0136734 A1* | 5/2012 | Jain | 705/16 |
| 2012/0217307 A1* | 8/2012 | Martin et al. | 235/492 |

* cited by examiner

NEAR FIELD COMMUNICATION DEVICE, AUTHENTICATION SYSTEM USING THE SAME AND AUTHENTICATION METHOD THEREOF

CROSS-REFERENCE TO RELATED APPLICATION

This application claims the priority benefit of Taiwan application serial no. 99131053, filed Sep. 14, 2010. The entirety of the above-mentioned patent application is hereby incorporated by reference herein and made a part of this specification.

BACKGROUND OF THE INVENTION

1. Field of the Invention

The invention relates generally to an authentication system employing near field communication (NFC) techniques, and more particularly to a NFC device, an authentication system using the NFC device, and an authentication method thereof.

2. Description of Related Art

Currency and monetary transaction systems for small payments in situations such as purchasing public transportation fares, tickets for movies or other spectacles, or drinks and magazines at a store are very inconvenient and clumsy for the consumer. The inconveniences may be due to the consumer not carrying enough change to purchase the needed product, or that the consumer requires exchange of a large bill to complete the transaction. However, after the storekeeper exchanges the large bill, the consumer is left with coins and bills of smaller value. As a result, the consumer often feels inconvenienced carrying and managing change when using bills and coins to make small purchases.

In light of the foregoing, transaction systems using contactless cards have gradually replaced the cash and coin transaction systems, thereby reducing the inconveniences of carrying and managing change for the user. As an example, contactless cards based on radio frequency identification (RFID) techniques have replaced cash in many places to become a popular method of payment and monetary transaction, due to the ease of operation and the gradual maturity of the related techniques. However, in order to record the added or deducted monetary value on a same contactless card, many RFID based contactless card payment methods write and store transaction data directly into the RFID tag in the card. This method of recording monetary value on the RFID tag lacks a third party as the independent authority for authenticating the transaction. Moreover, from a security standpoint, this method also poses a security risk which can inflict financial losses for the contactless card holders or the goods and services providers.

In addition, as mobile communication devices (e.g., cell phones) become popular, RFID tags are starting to be combined with these mobile communication devices to serve as another method to pay for small transactions. However, this method of payment cannot be used on regular cell phones without NFC capabilities. For RFID tags to be applicable in most of the mobile communication devices, NFC specifications must be built in the cell phone (e.g., the Nokia NFC cell phone). Moreover, due to the negative effects (e.g., magnetic interference and electromagnetic interference) on the RFID tags caused by the internal circuitry, battery, and antenna of the mobile communication device, this type of RFID tags is likely to fail to operate or generate unanticipated errors and result in unsuccessful transactions. Therefore, it is vitally important to improve the security problem and the unreliable operation of the RFID tagging technique used in the contactless monetary transactions.

SUMMARY OF THE INVENTION

Accordingly, the invention provides a near field communication (NFC) device, an authentication system using the NFC device, and an authentication method thereof capable of implementing a highly secure, reliable, and convenient authentication mechanism and a transaction method based the authentication mechanism.

From one perspective, the invention provides a NFC device which only stores the user identification (ID) and is not required to calculate or record the transaction amount of the transaction activity. From another perspective, the invention provides an integrated NFC device, in which the aforementioned NFC device is integrated with a communication device. However, any information exchange between the NFC device and the communication device is not necessary. Moreover, an electromagnetic interference (EMI) shield is provided between the NFC device and the communication device, so as to effectively prevent the electromagnetic interference and magnetic interference from the circuit and components in the communication device from impacting the NFC device, and thereby ensure the reliability of the authentication process and the transaction process. From another perspective, the invention provides an authentication system using the NFC device or the integrated NFC device, and an authentication method thereof. The authentication system obtains the user ID in the NFC device at a near end of the NFC device, and sends the user ID to a certification authority center located at a remote end of the Internet for authentication. Moreover, another application server may be used to calculate and record the amount of the transaction activity, so as to ensure the security of the authentication process and the transaction process.

According to an embodiment of the invention, a NFC device is provided. The NFC device includes a radio frequency identification (RFID) tag, a loop antenna, a flexible fabric wrapping material, and an EMI shield. The RFID tag is adapted for storing a user ID. The loop antenna is connected to the RFID tag, and when the NFC device is near a NFC reader device, the user ID is sent to the NFC reader device from the loop antenna. The EMI shield is disposed at a side of the NFC device, and the EMI shield is adapted for preventing electromagnetic interference and magnetic interference around the side. Moreover, the flexible fabric wrapping material completely wraps the RFID tag, the loop antenna, and the EMI shield.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
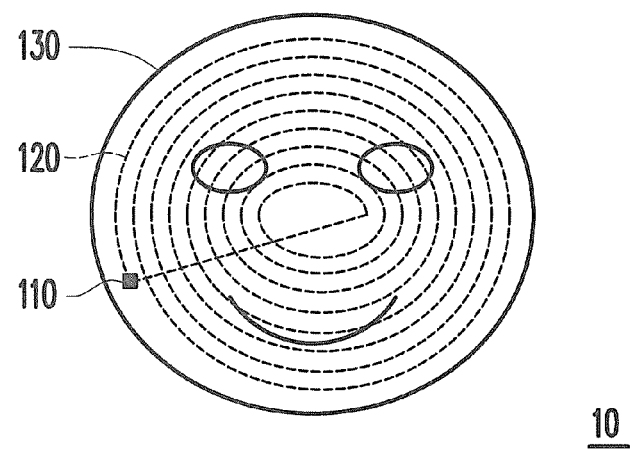
FIG. 1A is a schematic view illustrating a NFC device according to an exemplary embodiment of the invention.

FIG. 1A is a schematic view illustrating a near field communication (NFC) device 10 according to an exemplary embodiment of the invention. Referring to FIG. 1A, the NFC device 10 (hereinafter referred to as the device 10) includes a radio frequency identification (RFID) tag 110, a loop antenna 120, an electromagnetic interference (EMI) shield 130, and a flexible fabric wrapping material 140. The loop antenna 120 is connected to the RFID 110 but is isolated from the EMI shield 130. The flexible fabric wrapping material 140 is depicted schematically in FIG. 1A only, and the flexible fabric wrapping material 140 is used for packing the device 10 and providing a protective layer to completely wrap the RFID tag 110, the loop antenna 120, and the EMI shield 130 within. Moreover, the flexible fabric wrapping material 140 may be transparent, translucent, or opaque. In addition to the protective function, the flexible fabric wrapping material 140 may also correspond with a specific three dimensional (3-D) exterior pattern or a 2-D pattern to serve as a marketing advertisement or as decoration. Furthermore, the flexible fabric wrapping material 140 may have an elastic variation within a suitable degree (e.g., 15 degree curve) without cracking. In addition, a side of the flexible fabric wrapping material 140 has a suitable adhesiveness for adhering the device 10 on any electronic device or mobile communication device without damaging the outer shell thereof. The electronic device includes a cell phone, a smartphone, a flat panel computer, and a notebook computer.

In the present embodiment, the RFID tag 110 stores a user identification (ID), and the loop antenna 120 receives a RF signal and sends a RF signal. Accordingly, when an external NFC reader device provides a suitable RF signal to the device 10, the loop antenna 120 obtains sufficient energy to reflect a RF signal and sends the user ID to the external NFC reader device.

Figure 1B:
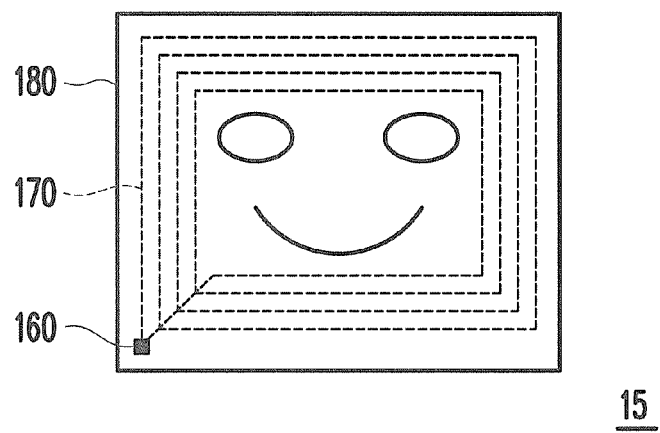
FIG. 1B is a schematic view illustrating another NFC device according to another exemplary embodiment of the invention.

In the present embodiment, the device 10 is a NFC readable device. The loop antenna 120 in FIG. 1A has an approximate circular shape. FIG. 1B is a schematic view according to another exemplary embodiment of the invention. The embodiment illustrated in FIG. 1B includes similar components (e.g., a RFID tag 160, a loop antenna 170, a EMI shield 180, and the flexible fabric wrapping material 140), but the loop antenna 170 has an approximate rectangular shape. However, the invention is not limited to the geometric shape of the aforementioned loop antenna, and in other embodiments, the loop antenna can have other shapes. Moreover, as long as the entire loop antenna 120 is completely wrapped, the flexible fabric wrapping material protecting the loop antenna may also take any arbitrary shape.

The device 10 proposed by the invention is suitable for (or adapted for) combinations of loop antenna 120 of any shape and RFID tag 110 of any type, as long as the combinations can implement the functions of the NFC readable device or the NFC readable/writable device. In most of the applicable situations, the information stored in the RFID tag 110 can be obtained by only a RFID reader device providing a suitable RF signal to the device 10, and therefore the device 10 does not need to have a function for writing information to the RFID tag 110.

Figure 1C:
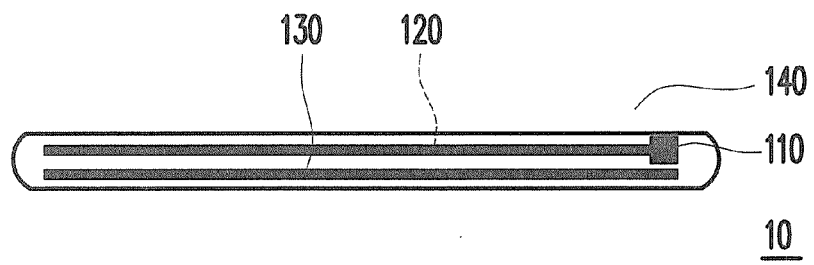
FIG. 1C is a lateral view of a NFC device according to an exemplary embodiment of the invention.

FIG. 1C is a lateral view of a device 10 according to an exemplary embodiment of the invention. Referring to both FIGS. 1A and 1B, in the device 10, the flexible fabric wrapping material 140 (e.g., the Stickkey anti-slip adhesive strip from LianYa Information Co.) completely wraps the RFID tag 110, the loop antenna 120, and the EMI shield 130 within. The EMI shield 130 can be an adhesive glue (e.g., the Shieldokit Conductive Adhesive Glue 3980 from Australian Holland Shielding Systems BV) coated on a side of the RFID 110 and the loop antenna 120, or an entire strip of EMI shielding tape (e.g., the Electrically Conductive Adhesive Transfer Tape 9703 from 3M or the EMI Woven Fabric KW-6 from Beijing Koolon Fiber Tech Co.) adapted for isolating nearby electronic devices, or isolating the negative effects (including magnetic and electromagnetic interference) on the loop antenna 120 caused by the internal components and circuit modules of the mobile communication device. The shielding frequency bands of the EMI shield 130 can be the frequency bands typically operated in RFID techniques, such as 125 kHZ, 134.2 kHz, 13.56 MHz, 130 MHz, 868-956 MHz, and 2.45 GHz.

For example, when the device 10 adheres the flexible fabric wrapping material 140 to an outer shell of a cell phone, due to the magnetic interference or the EMI respectively generated by the battery, antenna, power management circuit module, or the digital circuit module, the loop antenna 120 is unlikely to function normally. Therefore, when the EMI shield 130 of the device 10 is disposed nearer the outer shell of the cell phone, a shielding effect of a specific direction is provided (i.e., a direction toward the cell phone). Thus, the loop antenna 120 at another side away from the EMI shield 130 (also facing a side away from the cell phone) can operate normally. Accordingly, the combination of the RFID tag 110, the loop antenna 120, the EMI shield 130, and the flexible fabric wrapping material 140 depicted in FIG. 1C can effectively alleviate the problem of the loop antenna 120 being easily affected by the magnetic and electromagnetic interference from nearby electronic devices.

Figure 2:
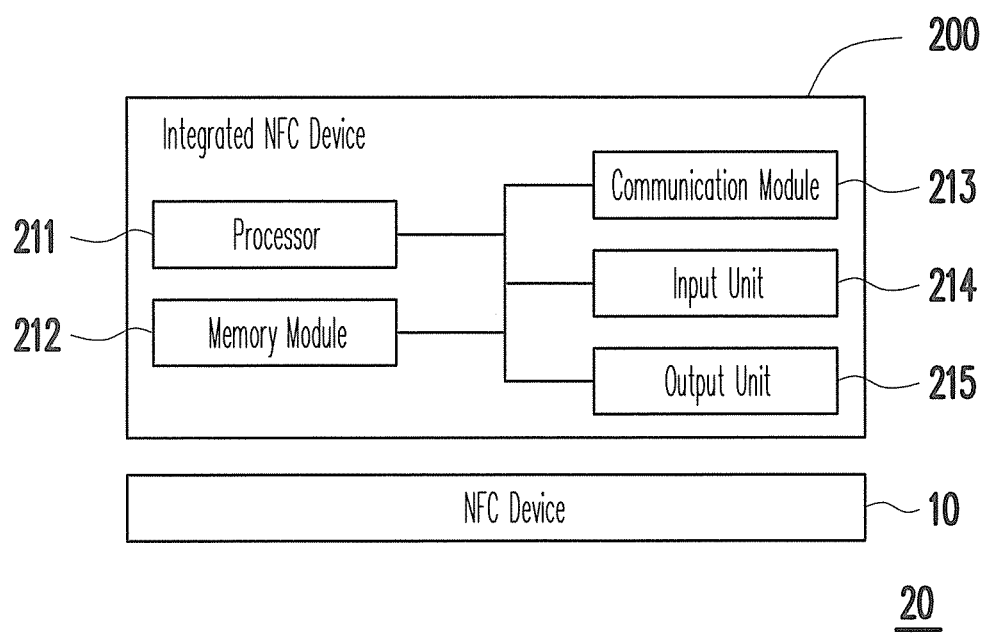
FIG. 2 is a functional block diagram of an integrated NFC device according to an exemplary embodiment of the invention.

FIG. 2 is a functional block diagram of an integrated NFC device 20 according to an exemplary embodiment of the invention. The integrated NFC device 20 (hereinafter referred to as the integrated device 20) is formed by a normal mobile communication device 200 (e.g., a cell phone) and a device 10. The device 10 is adhered to an upper side surface of the outer shell of the mobile communication device 200, such as an opposite side relative to the screen, or a same side relative to the location of the battery. The mobile communication device 200 includes a processor 211, a memory module 212, a communication module 213, an input unit 214, an output unit 215, and a NFC device 10 (hereinafter abbreviated as the device 10).

Referring to FIG. 2, the communication module 213 can be a wireless communication module adapted for establishing a link with a wireless access point device or a wireless base station to connect to the Internet. The communication module 213 includes a communication interface, an antenna, a RF circuit, a communication protocol unit, and a baseband circuit, etc. Moreover, in other embodiments, the communication module 213 may further include a subscriber identity module (or an identity module). The memory module 212 is coupled to the communication module 213, and adapted for storing the operating system, the firmware, the software, the drivers software, the application programs, and any program codes, data, or databases executable by the processor. The input unit 214 is coupled to the memory module 212, and adapted for receiving an input command from a subscriber. The input unit 214 may include a keypad, an input detection unit of a touch screen, or a microphone. The output unit 215 is coupled to the memory module 212, and adapted for outputting images or sounds, and the output unit 215 may include a screen or a speaker.

As shown in FIG. 2, the processor 211 is coupled to the memory module 212, the communication module 213, the input unit 214, and the output unit 215. The processor 211 is adapted for controlling or coordinating the memory module 212, the communication module 213, the input unit 214, and the output unit 215. Moreover, the processor 211 executes the operating system, the firmware, the software, the drivers software, the application programs, or any program codes executable by the processor. However, the mobile communication device 200 does not need to exchange information with the device 10.

Figure 3A:
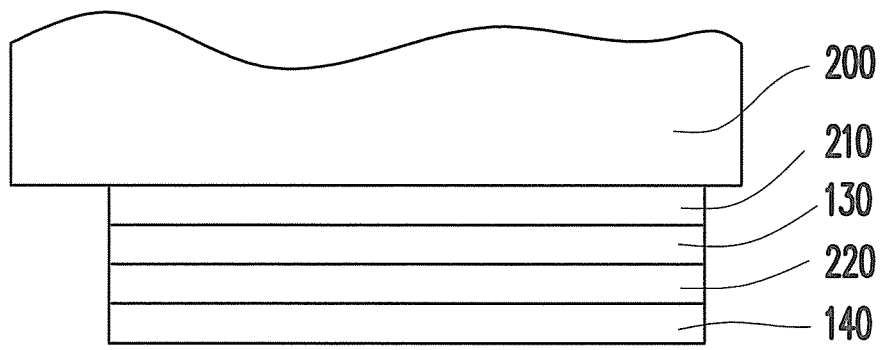
FIG. 3A is a stacked schematic view illustrating an assembled unit of an integrated NFC device according to an exemplary embodiment of the invention.
Figure 3B:
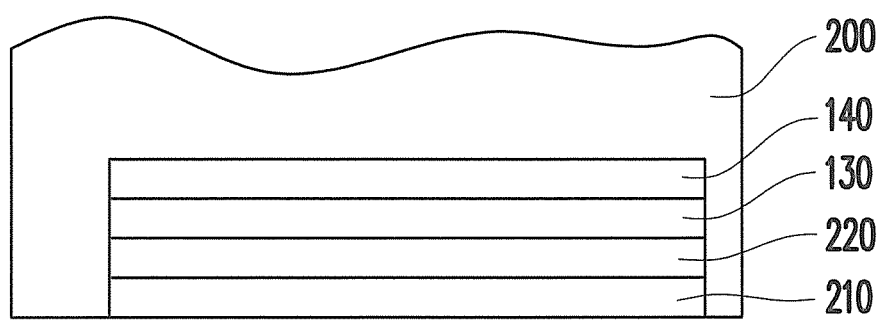
FIG. 3B is a stacked schematic view illustrating another assembled unit of an integrated NFC device according to another exemplary embodiment of the invention.

FIGS. 3A and 3B are stacked schematic views illustrating assembled units of the integrated device 20 when the device 10 is adhered to the mobile communication device 200 in the integrated device 20.

In FIG. 3A, when the device 10 is adhered to an outer side of the back cover (or the outer shell) of the mobile communication device 200, an adhesive material unit 210 nearest the mobile communication device 200 is adhered to the outer side of the back cover (or the outer shell) of the mobile communication device 200 (e.g., a cell phone). In sequence, the EMI shield 130, the loop antenna 120, an assembled unit 220 of the RFID tag 110, and a decorative wrapping unit 140 (e.g., the flexible fabric wrapping material 140) form the rest of the assembled unit of the integrated device 20.

In FIG. 3B, when the device 10 is adhered to an inner side of the back cover (or the outer shell) of the mobile communication device 200, the adhesive material unit 210 nearest the outer shell of the mobile communication device 200 is adhered to the inner side of the outer shell (or the inner side of the battery cover) of the mobile communication device 200. In sequence, the loop antenna 120, the assembled unit 220 of the RFID tag 110, the EMI shield 130, and the decorative wrapping unit 140 form the rest of the assembled unit of the integrated device 20. Moreover, when the device 10 is adhered to the inner side of the mobile communication device 200, the total thickness of the assembled unit of the device 10 can be controlled within a predefined space of the battery cover or inside the shell of the mobile communication device 200, such as 1 millimeter.

Figure 4:
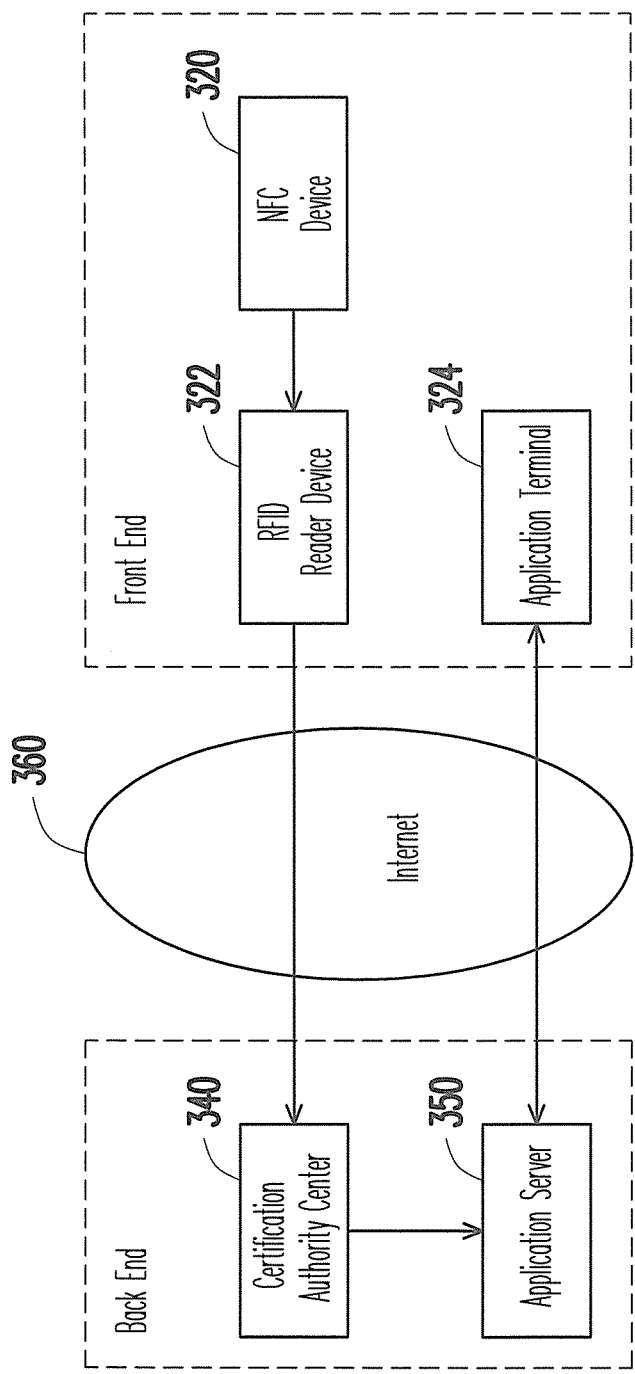
FIG. 4 is a schematic view of an authentication system data flow according to an exemplary embodiment of the invention.

FIG. 4 is a schematic view of an authentication system data flow 40 according to an exemplary embodiment of the invention. The authentication system data flow 40 includes the following process. First, a RFID reader device 322 at a front end obtains a user ID of a NFC device 320 (the device 10 or the integrated device 20). The RFID reader device 322 sends the user ID and the related data (e.g., the related data of the store and products where the RFID reader device 322 resides or the transaction amount) of the RFID reader device 322 to a certification authority center 340 at a back end through the Internet 360. After the certification authority center 340 completes authentication of the user and the store, the user ID or the user related data and the transaction data are sent to an application server 350 at the back end. After the application server 350 and an application terminal 324 of the store at the front end complete an information exchange related to the transaction service, the authentication process and the subsequent transaction services are completed. The authentication system using the NFC device and the authentication data flow have been described in the foregoing passages. In the following passages, the major components and their corresponding functions of an integrated NFC device formed by the NFC device and a mobile communication device are described.

Figure 5:
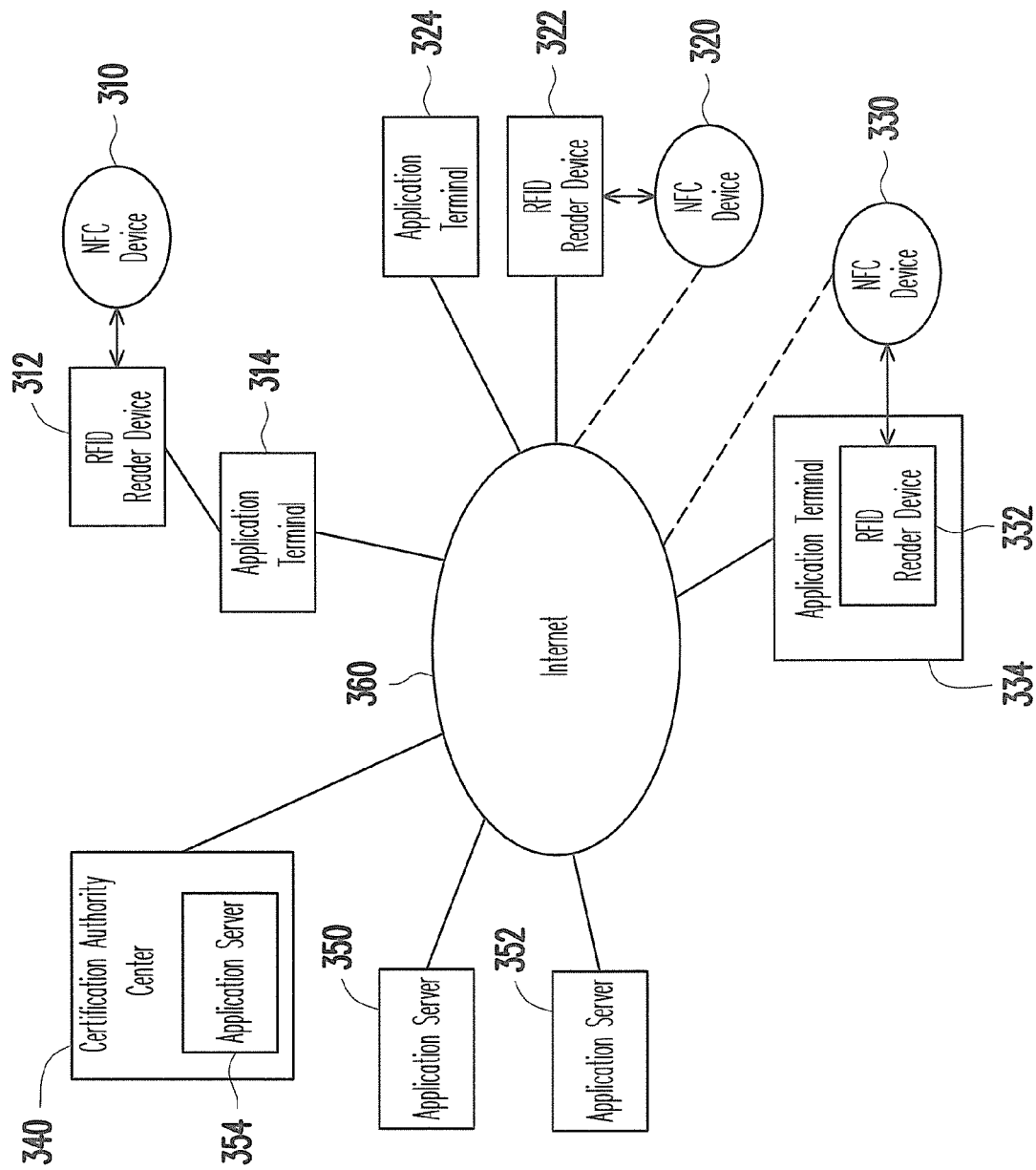
FIG. 5 is a schematic view of an authentication system using a NFC device according to an exemplary embodiment of the invention.

FIG. 5 is a schematic view of an authentication system 30 using a NFC device according to an exemplary embodiment of the invention. Referring to FIG. 5, the authentication system 30 includes at least a NFC device 320 (hereinafter referred to as the device 320 which is a NFC device 10 or an integrated NFC device 20 with a mobile communication device (e.g., by adhering the device 10 to the outer side of the outer shell of the mobile communication device)), at least a RFID reader device 322, and at least an application terminal 324. Moreover, the authentication system 30 further includes at least a certification authority center 340, at least an application server 350, and the Internet 360. The application server 350 connects to the certification authority center 340 and other units through the Internet 360.

Referring to FIG. 5, in one embodiment, the certification authority center 340 is an independent authentication server which may be configured at a credit card issuing agency, such as an authentication server from VISA. The certification authority center 340 may also be a network information center from each country or region, such as an authentication server from Taiwan Network Information Center (TWNIC). The certification authority center 340 may also be a unit within a telecom operator with credible independent authentication. The certification authority center 340 may also have functionalities for authentication, authorization, and accounting. The RFID reader device 322 and the application terminal 324 are configured at the front end customer contact points of the stores or service providers which provide goods and services. The application server 350 is the back end server of the service provider. The application server 350 may provide corresponding services to a plurality of RFID reader devices 312 and 322, application servers 314 and 324, and stores or customer contact points providing the services or products. Another application server 352 provides different services to the RFID reader device 332, the application terminal 334, and stores or customer contact points providing the services or products. The NFC devices 310, 320, and 330 are used for identity authentication of the customers of the products or services.

As shown in FIG. 5, the device 320, the RFID reader device 322, and the application terminal 324 are respectively connected to the Internet 360. The device 320 stores a user ID in a RFID tag therein, and when the device 320 is near the RFID reader device 322, the RFID reader device 322 obtains the user ID. As in the previously mentioned passages describing FIG. 4, the RFID reader device 322 sends the user ID to the certification authority center 340. The authentication process and the subsequent transaction activity are performed according to the user ID. It is assumed here that the transaction activity involves a user purchasing a product (e.g., purchasing a beverage) or a service (e.g., purchasing a train ticket or using the device 320 to deduct fare for riding mass transportation) at a store or a transaction location which has installed the RFID reader device 322. Moreover, the RFID reader device 322 is coupled to the application terminal 324, and the application terminal 324 is coupled to the certification authority center 340 for sending the user ID and the transaction or service data to the certification authority center 340 in order to perform a user authentication action (or a user identity authentication action) and a store authentication action. After the authentication action is completed, the subsequent transaction and service data (e.g., the product serial numbers, service content, deduction amount, or the store identity) are obtained from a data exchange with the application server 350 corresponding to the type of the application terminal 324 and the current transaction.

In the present embodiment, after the certification authority center 340 completes the user authentication action, the subsequent processing may be performed according to whether current transaction activity requires name records or does not require name records (corresponding to the transaction activity being performed anonymously).

When current transaction requires name records, the certification authority center 340 sends a user related data (corresponding to the user ID) to the application server 350. Next, the application server 350 may use the user related data and a deduction amount to perform an account deduction action for the user, and to refresh an account balance (corresponding to the user ID) of the user. When current transaction does not require name records (i.e., the transaction activity is performed anonymously), the certification authority center 340 only returns an authentication success message (not including the user identity related data) and the transaction data to the application server 350. Thereafter, according to the user ID, the application server 350 refreshes the account balance corresponding to the user ID. When necessary, the application server 350 may interact with the corresponding application terminal 324 and the store or customer contact points, so as to achieve transaction or service functions.

In the present embodiment, the process flow of the account deduction action may be applicable to the account add value action, in which the application server 350 refreshes the account balance after the value is added according to the user ID. However, it should be noted that, from the beginning to the end of the transaction, the device 320 may not store any data on the numerical transaction amount. More specifically, the RFID tag of the device 320 may not store any data on the transaction amount. Accordingly, the security risk of writing data into the device 320 can be prevented, and the safety of the entire transaction is ensured. Moreover, before the account deduction action or the add value action, application server 350 may also remind the user of the related account deduction or add value status. For example, the application server 350 may warn the user of an impending account deduction by notifying the cell phone of the user with sending an email or a short message. When the device 10 is adhered to the outer shell of the mobile communication device, the user may receive a real-time confirmation on the screen of the mobile communication device. Moreover, in other embodiments of the invention, before the account deduction action or the account add value action, the application server 350 may prompt the user to provide a password to further obtain the real-time transaction confirmation by sending an email or a short message to the cell phone of the user, or by using a program on the cell phone (e.g., a smartphone) of the user.

The application server may also be a function unit only. In another embodiment of the invention, the application server 354 depicted in FIG. 5 is directly built-in the certification authority center 340, but has the same functionalities as the application servers 350 or 352, such as accepting the authentication data from the certification authority center 340 and interacting with the application terminal to complete the transaction or service, which are similar to the certification authority center 340 directly interacting with the application terminal to complete the transaction or service.

The application server may also be a function unit only. In another embodiment of the invention, the application server and the application terminal have overlapping applicability but with the same functionalities as the application servers 350 or 352, such as accepting the authentication data from the certification authority center 340 and interacting with the application terminal to complete the transaction or service, which are similar to the application terminal directly completing the transaction or service after the application terminal directly accepts the authentication data from the certification authority center 340.

In another embodiment of the invention, the authentication system 30 may include a NFC device 310 (not connected to the Internet 360), an application terminal 314, and a RFID reader device 312 (directly connected to the application terminal 314). The NFC device 310, the application terminal 314, and the RFID reader device 312 respectively have functionalities similar to the device 320, the application terminal 324, and the RFID reader device 322. Moreover, in another embodiment, the authentication system 30 may include a NFC device 330 and an application terminal 334 (integrated with a RFID reader device 332). Similarly, the NFC device 330, the RFID reader device 332, and the application terminal 334 respectively have functionalities similar to the device 320, the RFID reader device 322, and the application terminal 324. Moreover, the authentication system 30 may include other application servers corresponding to different services, such as an application server 352. Furthermore, a plurality of application terminals may correspond to a same application server. For example, the RFID reader device 312 and the application terminal 314 correspond to the application server 350, the RFID reader device 322 and the application terminal 324 also correspond to the application server 350, and the RFID reader device 332 and the application terminal 334 correspond to the application server 352.

Figure 6:
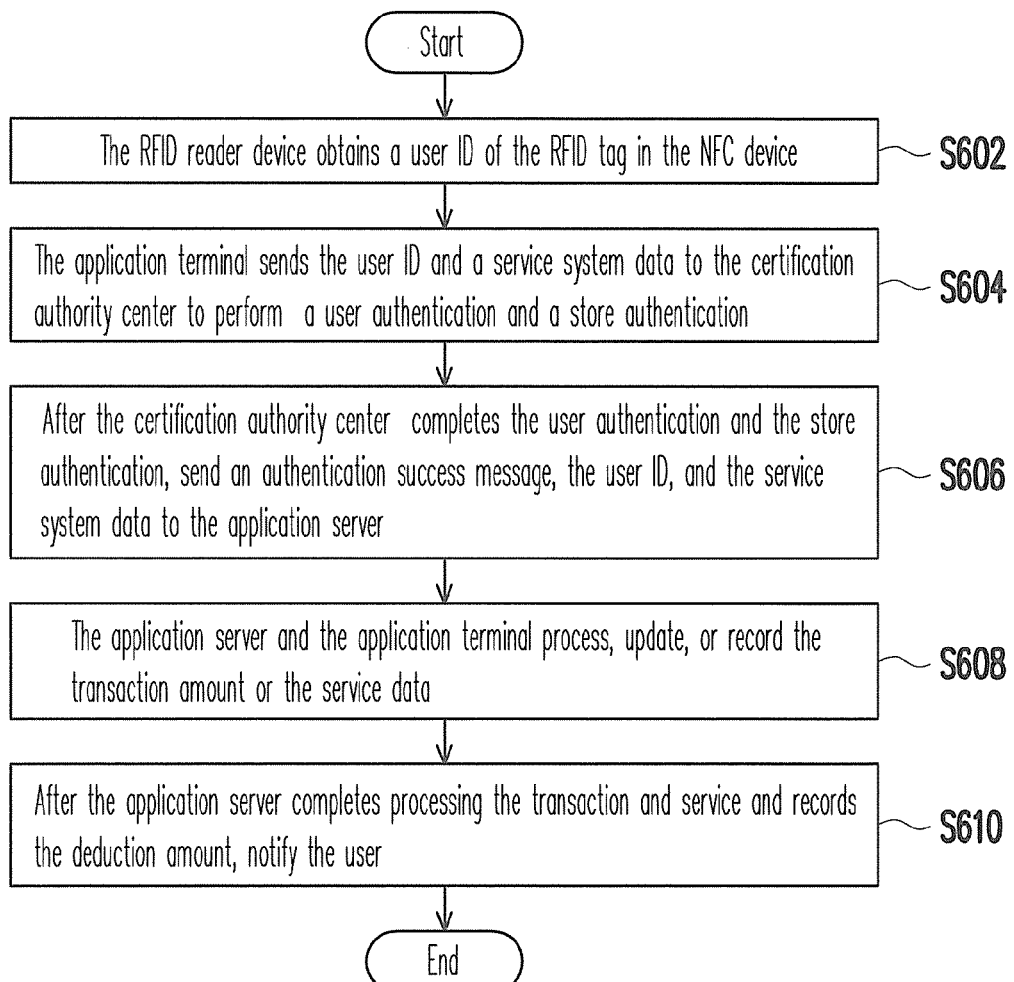
FIG. 6 is a schematic view of an authentication method using a NFC device according to an exemplary embodiment of the invention.

FIG. 6 is a schematic view of an authentication method 60 using a NFC device according to an exemplary embodiment of the invention. The authentication method 60 is an authentication method that does not record names. Referring to FIGS. 4-6, the authentication method 60 begins with a Step S602, in which the RFID reader device 322 obtains a user ID of the RFID tag in the device 320 (Step S602). The application terminal 324 obtains the user ID from the RFID reader device 322, and sends the user ID and a service system data (including a store ID code of the store where the RFID reader device 322 is located and the identity related data of the application terminal 324) to the certification authority center 340 to perform a user authentication action and a store authentication action (Step S604). After the certification authority center 340 completes the user authentication and the store authentication, an authentication success message, the user ID (or the user authentication data), and the service system data are sent to the application server 350 (Step S606). Moreover, the application server 350 and the application terminal 324 process, refresh, or record the transaction amount or the service data. In addition, in other embodiments, after the certification authority center 340 completes the user authentication action, user authentication data may be sent to the application terminal 324, in which the application terminal 324 process, refresh, or record a transaction amount and a service data. The service data includes the amount to deduct for the current transaction. The application server 350 and the application terminal 324 process, update, or record the transaction amount or the service data (Step S608). The application server 350 completes processing the transaction and service, and records the deduction amount, for example. Thereafter, the user is notified (Step S610) and the authentication method 60 ends.

It should be noted that in other embodiments, for the Step S610, the output unit 215 of the device 320 can display a transaction confirmation message to the user by the application server 350 sending a message, a short message, or an email to the device 320. Alternatively, in other embodiments, for the Step S610, the transaction confirmation message can be displayed for the user by the application server 350 sending the transaction success message to device 320 or the application terminal 324. For example, the RFID reader device 322 can be configured at the entrance and exit of a train station. When the user enters using a contactless card swipe method, the RFID reader device 322 has a display screen or a sound output device to notify the user of the transaction success and the deduction amount of the this transaction, or the remaining balance after the transaction. Moreover, the authentication method 60 may also be used in an add value mechanism. As long as the deduction amount in the Steps S608-S610 is replaced with the added amount, adding value to the account corresponding to the user ID in the device 320 can be implemented. Furthermore, in other embodiments, the authentication method 60 may be adapted for only the device 320. In other words, the user has not adhered the device 320 on any electronic or communication device, and the transaction proceeds by placing only the device 320 near the NFC reader device 220.

Figure 7:
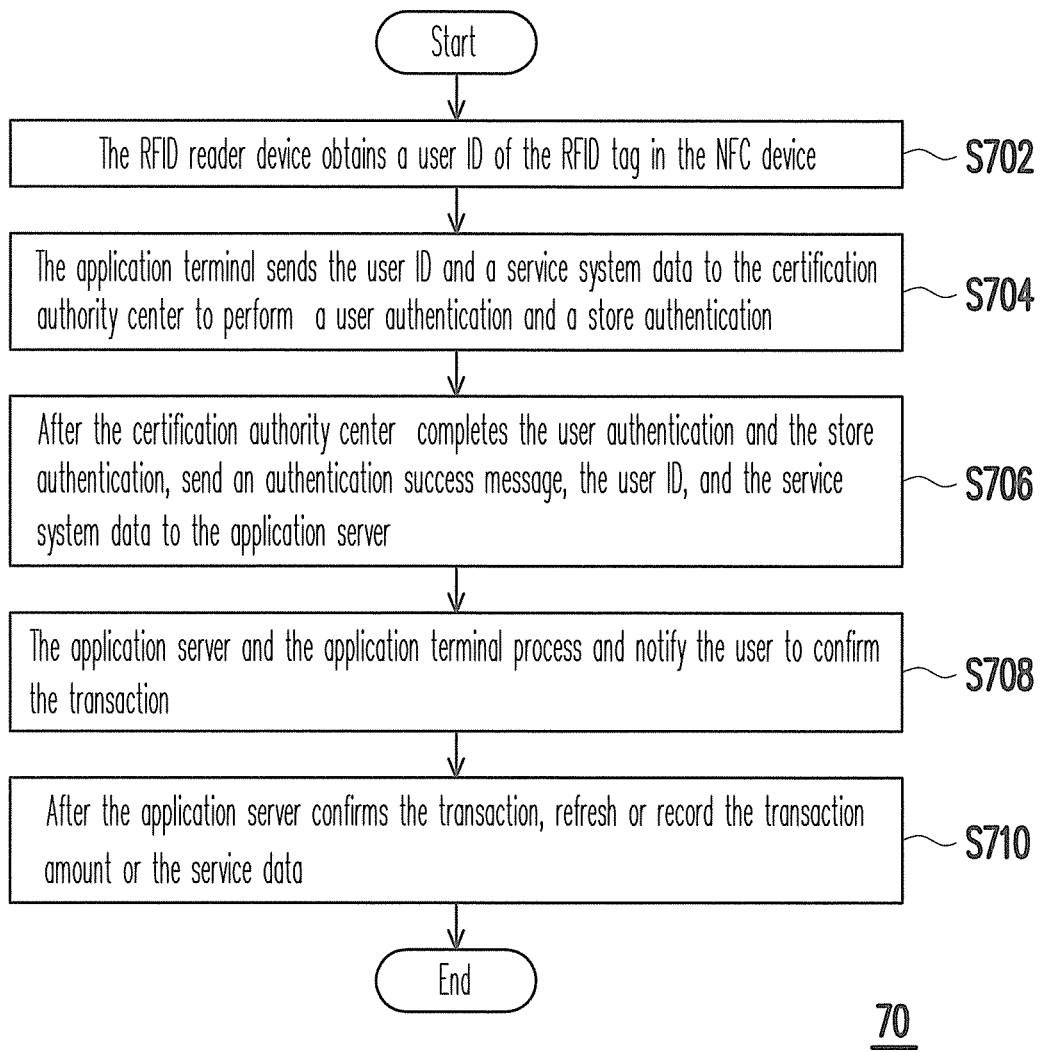
FIG. 7 is a schematic view of another authentication method using a NFC device according to another exemplary embodiment of the invention.

FIG. 7 is a schematic view of another authentication method 70 using a NFC device according to another exemplary embodiment of the invention. The authentication method 70 is an authentication method that does not record names. Referring to FIGS. 4-7, the Steps S702-S706 in the authentication method 70 of FIG. 7 are similar to the Steps S602-S606 in the authentication method 60, and therefore further elaboration is omitted here. In a Step S708 of the authentication method 70, the store and the user are notified to confirm the transaction by the processing of the application server 350 and the application terminal 324. The store may be notified by configuring a screen or a sound output device at the application terminal 324 or the RFID reader device 322 to notify the store or the customer service point whether to complete the transaction. Alternatively, the confirmation by the store on the transaction may be completed by the application terminal 324 or the input device of the RFID reader device 322, for example, with a keypad input device for inputting a personal password. In a Step S710, after the application server 350 confirms this transaction, the transaction amount or the service data are refreshed or recorded.

The user confirms is the transaction in the Step S708. By the application server 350 sending a message or a short message to the device 320, or by using an application program installed in the device 320 in advance, the output unit 215 of the device 320 displays the notification of the transaction confirmation. Moreover, the user responds to the server 350 by selection on the keypad or the touch screen of the input unit 214, and accordingly the transaction is completed. Furthermore, the application server 350 may dial to a phone number of the device 320 through a call center, so the user hears a voice notification, or the user may confirm the transaction with a customer representative from the call center over the telephone. Additionally, the authentication method 70 may also be adapted for only the device 320 and for an add value mechanism. As long as the deduction amount in the Steps S708-S710 is replaced with the added amount, adding value to the account in the device 320, or the account corresponding to the user ID in the device 320 can be implemented.

Figure 8:
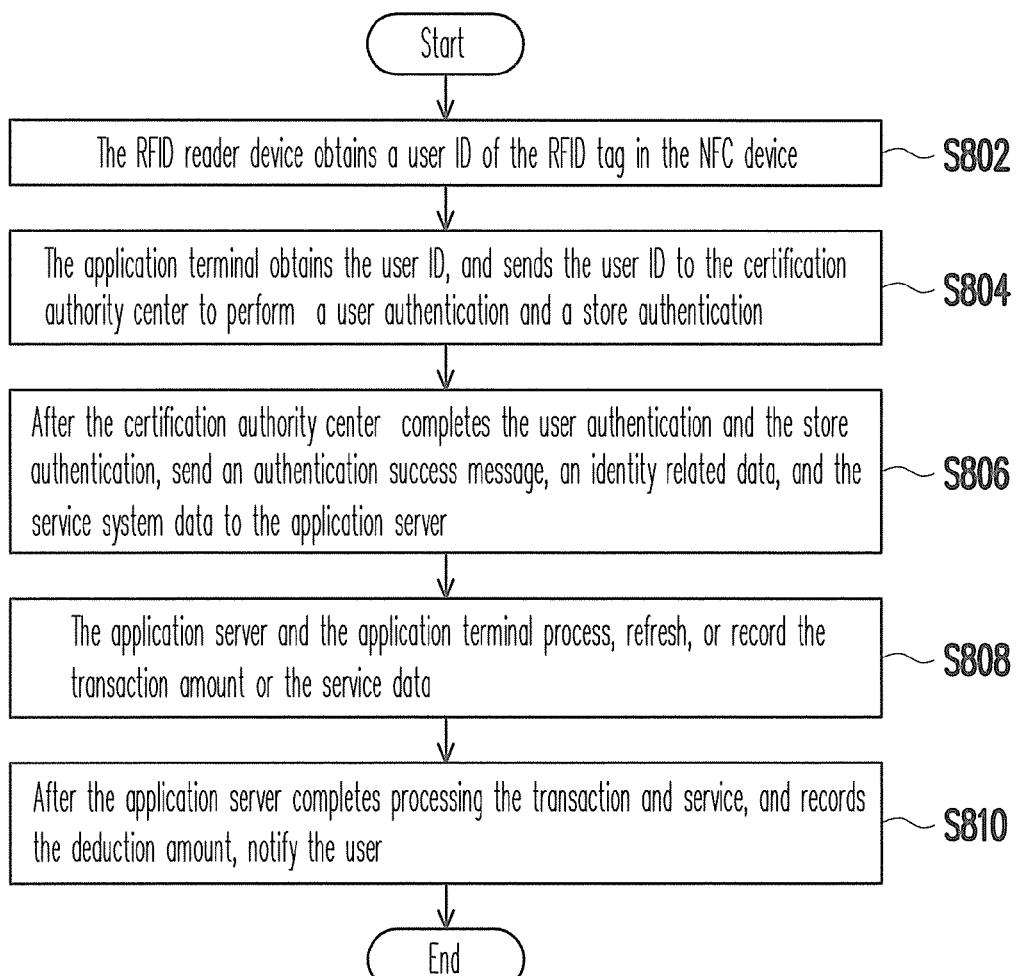
FIG. 8 is a schematic view of another authentication method using a NFC device according to another exemplary embodiment of the invention.

FIG. 8 is a schematic view of another authentication method 80 using a NFC device according to another exemplary embodiment of the invention. The authentication method 80 is an authentication method that records names. Referring to FIGS. 4, 5, 6, and 8, the Steps S802-S804 in the authentication method 80 of FIG. 8 are similar to the Steps S602-S604 in the authentication method 60, and therefore further elaboration is omitted here. In a Step S806 of the authentication method 80, after the certification authority center 340 completes the user authentication and the store authentication, the certification authority center 340 sends an identity related data of the user, an authentication success message, and a service system data to the application server 350. The application server 350 and the application terminal 324 process, update, or record the transaction amount or the service data (Step S808). After the application server 350 completes processing the transaction and service and records the deduction amount, for example, the user is notified (Step S810), and the authentication method 80 ends. The methods of notification and transaction confirmation may be similar to the Step S708 of FIG. 7, and therefore further elaboration of the details thereof is omitted here. Moreover, in the Step S810, the authentication method 80 may be similar to the Step S708 of FIG. 7, with the application server 350 sending a message to the device 320, and the user responding to the application server 350 with a selection so the transaction is officially confirmed.

By adopting the authentication system and authentication method proposed by exemplary embodiments of the invention, the user may interact with the servers (including databases) of the online stores on the Internet. Moreover, the online stores may provide the consumer with rich information services, including providing multimedia services to the NFC device 320 owned by the consumer during the transaction process. The consumer only needs to place the device 320 on the NFC device near the RFID reader device 322 to complete the payment action. After payment or balance deduction, the application server 350 may subsequently retrieve this amount of money through a credit card issuing agency, or the money can be retrieved by using a credit card bill or a telecommunication bill through a collaborating telecommunication company. The device 320 may not record any transaction amount data and only store the user ID. The transaction balance related data are recorded, calculated, and processed by the electronic transaction server. Accordingly, the circuit complexity and production costs of the device 320 can be drastically reduced, and thus the NFC device can find a wide applicability. Moreover, the authentication system and method may not be limited only to transaction activities, but are also applicable to any services requiring user authentication and user authorization.

An application service provider of an application server located at a remote end of a network cloud, a store configured with a NFC reader device located at a near end of the cloud, and a user of a NFC device are three independent bodies. The application service provider may be a telecom operator or be any application service provider of interne service. For other more complex application services, an information processing system may be configured at the application server at the remote end of the network cloud, and an application client system on a network edge may be configured at the NFC reader device of the store at the near end of the cloud. Before establishing a service, the service content and flow of the application service are defined beforehand, and the application server, the NFC reader device, and the NFC device are notified. The application server, the NFC reader device, and the NFC device perform the required information exchange (i.e., dialogue) through the Internet (i.e., cloud), such as for a balance calculation action, a transaction deduction authorization, and a receipt issue action.

In view of the foregoing, exemplary embodiments of the invention provide a NFC device, an authentication system using the NFC device, and an authentication method thereof The NFC device may be integrated with a communication device, but any information exchange between the NFC device and the communication device is not necessary. The authentication system obtains the user ID in the NFC device, and sends the user ID to a certification authority center located at a remote end of the Internet for authentication. Moreover, another application server may be used to calculate and record the amount of the transaction activity. Accordingly, the authentication system can achieve an authentication mechanism that is highly secure, reliable, and convenient, as well as a transaction method based on the authentication mechanism.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. An authentication system, comprising:
a NFC device, comprising:
a RFID tag, storing a user ID;
a loop antenna connected to the RFID tag, sending the user ID to a NFC reader device when the NFC device is near the NFC reader device;
an EMI shield disposed at a side of the NFC device, preventing electromagnetic interference and magnetic interference around the side; and
a flexible fabric wrapping material, completely wrapping the RFID tag, the loop antenna, and the EMI shield,
wherein when the NFC reader device is near the NFC device, the loop antenna communicates the user ID to the NFC reader device;
a certification authority center connected to the NFC reader device through the Internet, obtaining the user ID and performing a user authentication action according to the user ID;
an application server connected to the certification authority center; and
an application terminal connected to the application server, wherein after the user authentication action is completed, the certification authority center sends user authentication data to the application server, and the application server and the application terminal process, refresh, or update at least a transaction amount or at least a service data.

2. The authentication system as claimed in claim 1, wherein after the user authentication action is completed, the certification authority center sends an identity related data corresponding to the user ID to the application server.

3. The authentication system as claimed in claim 1, wherein after the user authentication action is completed, the certification authority center sends an authentication success message to the application server.

* * * * *